United States Patent
Liu et al.

(10) Patent No.: US 12,355,995 B2
(45) Date of Patent: *Jul. 8, 2025

(54) CONTENT-BASED CLIENT SIDE VIDEO TRANSCODING

(71) Applicant: Snap Inc., Santa Monica, CA (US)

(72) Inventors: Liu Liu, Marina Del Rey, CA (US);
Chao Pang, Marina Del Rey, CA (US);
Rong Yan, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/755,515

(22) Filed: Jun. 26, 2024

(65) Prior Publication Data
US 2024/0348808 A1    Oct. 17, 2024

Related U.S. Application Data

(63) Continuation of application No. 18/452,016, filed on Aug. 18, 2023, now Pat. No. 12,069,281, which is a
(Continued)

(51) Int. Cl.
*H04N 19/40* (2014.01)
*H04L 65/70* (2022.01)
(Continued)

(52) U.S. Cl.
CPC ............. *H04N 19/40* (2014.11); *H04L 65/70* (2022.05); *H04L 65/762* (2022.05); *H04N 5/77* (2013.01); *H04N 5/9261* (2013.01); *H04N 9/8042* (2013.01); *H04N 19/137* (2014.11); *H04N 19/14* (2014.11); *H04N 19/146* (2014.11);
(Continued)

(58) Field of Classification Search
USPC ........................................................ 386/328
See application file for complete search history.

(56) References Cited

U.S. PATENT DOCUMENTS

| | | |
|---|---|---|
| 6,038,295 A | 3/2000 | Mattes |
| 6,980,909 B2 | 12/2005 | Root et al. |

(Continued)

FOREIGN PATENT DOCUMENTS

| | | |
|---|---|---|
| CA | 2887596 A1 | 7/2015 |
| CN | 103379335 A | 10/2013 |

(Continued)

OTHER PUBLICATIONS

"U.S. Appl. No. 15/622,336, Corrected Notice of Allowability mailed Feb. 25, 2021", 3 pgs.
(Continued)

*Primary Examiner* — Nigar Chowdhury
(74) *Attorney, Agent, or Firm* — Schwegman Lundberg & Woessner, P.A.

(57) ABSTRACT

Among other things, embodiments of the present disclosure improve the functionality of electronic messaging and imaging software and systems by automating the client-side transcoding of video data based on content. For example, an appropriate transcoding configuration can be selected for video data having complex motion or textures. Accordingly, video quality can be improve when complex motions or textures are present.

20 Claims, 9 Drawing Sheets

Related U.S. Application Data continuation of application No. 17/322,407, filed on May 17, 2021, now Pat. No. 11,778,209, which is a continuation of application No. 15/622,336, filed on Jun. 14, 2017, now Pat. No. 11,019,349.

(60) Provisional application No. 62/448,465, filed on Jan. 20, 2017.

(51) Int. Cl.

| | | |
|---|---|---|
| *H04L 65/75* | (2022.01) | |
| *H04N 5/77* | (2006.01) | |
| *H04N 5/926* | (2006.01) | |
| *H04N 9/804* | (2006.01) | |
| *H04N 19/137* | (2014.01) | |
| *H04N 19/14* | (2014.01) | |
| *H04N 19/146* | (2014.01) | |
| *H04N 19/162* | (2014.01) | |
| *H04N 19/179* | (2014.01) | |
| *H04N 21/2662* | (2011.01) | |
| *H04N 21/4223* | (2011.01) | |
| *H04N 21/433* | (2011.01) | |
| *H04N 21/4402* | (2011.01) | |
| *H04N 5/228* | (2006.01) | |
| *H04N 21/422* | (2011.01) | |
| *H04W 88/18* | (2009.01) | |

(52) U.S. Cl.
CPC ......... *H04N 19/162* (2014.11); *H04N 19/179* (2014.11); *H04N 21/2662* (2013.01); *H04N 21/4223* (2013.01); *H04N 21/4334* (2013.01); *H04N 21/4402* (2013.01); *H04W 88/181* (2013.01)

(56) References Cited

U.S. PATENT DOCUMENTS

| | | | |
|---|---|---|---|
| 7,173,651 B1 | 2/2007 | Knowles | |
| 7,295,614 B1 | 11/2007 | Shen et al. | |
| 7,411,493 B2 | 8/2008 | Smith | |
| 7,535,890 B2 | 5/2009 | Rojas | |
| 8,131,597 B2 | 3/2012 | Hudetz | |
| 8,199,747 B2 | 6/2012 | Rojas et al. | |
| 8,332,475 B2 | 12/2012 | Rosen et al. | |
| 8,718,333 B2 | 5/2014 | Wolf et al. | |
| 8,724,622 B2 | 5/2014 | Rojas | |
| 8,874,677 B2 | 10/2014 | Rosen et al. | |
| 8,909,679 B2 | 12/2014 | Root et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,656 B2 | 8/2015 | Metoevi et al. | |
| 9,100,806 B2 | 8/2015 | Rosen et al. | |
| 9,100,807 B2 | 8/2015 | Rosen et al. | |
| 9,191,776 B2 | 11/2015 | Root et al. | |
| 9,204,252 B2 | 12/2015 | Root | |
| 9,443,227 B2 | 9/2016 | Evans et al. | |
| 9,489,661 B2 | 11/2016 | Evans et al. | |
| 9,491,134 B2 | 11/2016 | Rosen et al. | |
| 9,769,527 B2 | 9/2017 | Frusina et al. | |
| 9,860,569 B1 | 1/2018 | Wilms et al. | |
| 10,255,946 B1 | 4/2019 | Andrizzi et al. | |
| 10,419,738 B1* | 9/2019 | Phillips | H04N 21/6587 |
| 11,019,349 B2 | 5/2021 | Liu et al. | |
| 11,778,209 B2 | 10/2023 | Liu et al. | |
| 2002/0122603 A1 | 9/2002 | Boroczky et al. | |
| 2002/0131512 A1 | 9/2002 | Boroczky et al. | |
| 2003/0123747 A1 | 7/2003 | Yang et al. | |
| 2003/0206591 A1 | 11/2003 | Yang et al. | |
| 2005/0089043 A1 | 4/2005 | Seckin et al. | |
| 2005/0097209 A1 | 5/2005 | Mcdonagh et al. | |
| 2005/0099492 A1 | 5/2005 | Orr | |
| 2006/0170778 A1 | 8/2006 | Ely et al. | |
| 2006/0215766 A1 | 9/2006 | Wang et al. | |
| 2006/0238444 A1 | 10/2006 | Wang et al. | |
| 2006/0238445 A1 | 10/2006 | Wang et al. | |
| 2009/0196339 A1 | 8/2009 | Hirabayashi | |
| 2010/0074333 A1 | 3/2010 | Au et al. | |
| 2010/0097473 A1 | 4/2010 | Park et al. | |
| 2011/0202598 A1 | 8/2011 | Evans et al. | |
| 2012/0155553 A1 | 6/2012 | Liao et al. | |
| 2012/0209924 A1 | 8/2012 | Evans et al. | |
| 2013/0148741 A1 | 6/2013 | Steinberg et al. | |
| 2013/0192506 A1 | 8/2013 | Buzzi | |
| 2013/0272374 A1 | 10/2013 | Shastri et al. | |
| 2013/0286868 A1 | 10/2013 | Oyman et al. | |
| 2013/0343450 A1 | 12/2013 | Solka et al. | |
| 2015/0089026 A1 | 3/2015 | Payette et al. | |
| 2016/0021380 A1 | 1/2016 | Li et al. | |
| 2016/0212482 A1 | 7/2016 | Balko | |
| 2016/0234496 A1 | 8/2016 | Panda et al. | |
| 2016/0249079 A1 | 8/2016 | Malone et al. | |
| 2017/0318335 A1 | 11/2017 | Ding et al. | |
| 2018/0014090 A1 | 1/2018 | Venkatraman et al. | |
| 2018/0124146 A1 | 5/2018 | Chen et al. | |
| 2018/0213243 A1 | 7/2018 | Liu et al. | |
| 2019/0190976 A1* | 6/2019 | Chen | H04N 21/23418 |
| 2019/0288911 A1* | 9/2019 | Amini | G06V 20/52 |
| 2019/0387224 A1* | 12/2019 | Phillips | H04N 19/177 |
| 2019/0387237 A1* | 12/2019 | Phillips | H04N 21/8456 |
| 2021/0385470 A1 | 12/2021 | Liu et al. | |
| 2023/0396785 A1 | 12/2023 | Liu et al. | |

FOREIGN PATENT DOCUMENTS

| | | |
|---|---|---|
| CN | 105187835 A | 12/2015 |
| CN | 110192395 A | 8/2019 |
| CN | 110192395 B | 7/2021 |
| EP | 1622384 A2 | 2/2006 |
| EP | 3571847 B1 | 7/2023 |
| KR | 20080090335 A | 10/2008 |
| KR | 102356924 B1 | 2/2022 |
| WO | WO-2016134345 A1 | 8/2016 |
| WO | WO-2018136219 | 7/2018 |

OTHER PUBLICATIONS

"U.S. Appl. No. 15/622,336, Examiner Interview Summary mailed Jul. 8, 2020", 3 pgs.

"U.S. Appl. No. 15/622,336, Final Office Action mailed Apr. 3, 2020", 19 pgs.

"U.S. Appl. No. 15/622,336, Final Office Action mailed Apr. 18, 2019", 17 pgs.

"U.S. Appl. No. 15/622,336, Non Final Office Action mailed Jul. 12, 2018", 15 pgs.

"U.S. Appl. No. 15/622,336, Non Final Office Action mailed Aug. 6, 2020", 20 pgs.

"U.S. Appl. No. 15/622,336, Non Final Office Action mailed Aug. 22, 2019", 16 pgs.

"U.S. Appl. No. 15/622,336, Notice of Allowance mailed Jan. 26, 2021", 9 pgs.

"U.S. Appl. No. 15/622,336, Response filed Jan. 14, 2019 to Non Final Office Action mailed Jul. 12, 2018", 8 pgs.

"U.S. Appl. No. 15/622,336, Response filed Jan. 22, 2020 to Non Final Office Action mailed Aug. 22, 2019", 8 pgs.

"U.S. Appl. No. 15/622,336, Response filed Jul. 6, 2020 to Final Office Action mailed Apr. 3, 2020", 7 pgs.

"U.S. Appl. No. 15/622,336, Response filed Jul. 18, 2019 to Final Office Action mailed Apr. 18, 2019", 8 pgs.

"U.S. Appl. No. 15/622,336, Response filed Oct. 28, 2020 to Non Final Office Action mailed Aug. 6, 2020", 9 pgs.

"U.S. Appl. No. 17/322,407, Final Office Action mailed Feb. 24, 2023", 14 pgs.

"U.S. Appl. No. 17/322,407, Non Final Office Action mailed Sep. 27, 2022", 11 pgs.

"U.S. Appl. No. 17/322,407, Notice of Allowance mailed May 25, 2023", 9 pgs.

(56) References Cited

OTHER PUBLICATIONS

"U.S. Appl. No. 17/322,407, Response filed Apr. 19, 2023 to Final Office Action mailed Feb. 24, 2023", 7 pgs.
"U.S. Appl. No. 17/322,407, Response filed Dec. 27, 2022 to Non Final Office Action mailed Sep. 27, 2022", 7 pgs.
"U.S. Appl. No. 18/452,016, Corrected Notice of Allowability mailed May 3, 2024", 2 pgs.
"U.S. Appl. No. 18/452,016, Non Final Office Action mailed Mar. 14, 2024", 21 pgs.
"U.S. Appl. No. 18/452,016, Notice of Allowance mailed Apr. 11, 2024", 9 pgs.
"U.S. Appl. No. 18/452,016, Response filed Apr. 3, 2024 to Non Final Office Action mailed Mar. 14, 2024", 7 pgs.
"Chinese Application Serial No. 201780083935.2, Office Action mailed Nov. 6, 2020", w/ English Translation, 13 pgs.
"Chinese Application Serial No. 201780083935.2, Response filed Mar. 1, 2021 to Office Action mailed Nov. 6, 2020", w/ English Claims, 12 pgs.
"European Application Serial No. 17870639.6, Communication Pursuant to Article 94(3) EPC mailed Sep. 21, 2020", 6 pgs.
"European Application Serial No. 17870639.6, Response filed Feb. 1, 2021 to Communication Pursuant to Article 94(3) EPC mailed Sep. 21, 2020", 6 pgs.
"European Application Serial No. 17870639.6, Response to Communication pursuant Rules 161(1) and 162 EPC filed Mar. 5, 2020", 10 pgs.
"European Application Serial No. 17870639.6, Summons to Attend Oral Proceedings mailed Sep. 29, 2022", 11 pgs.
"European Application Serial No. 23180168.9, Extended European Search Report mailed Sep. 22, 2023", 14 pgs.
"European Application Serial No. 23180168.9, Response filed Apr. 17, 2024 to Extended European Search Report mailed Sep. 22, 2023", 22 pgs.
"International Application Serial No. PCT/US2017/068902, International Preliminary Report on Patentability mailed Aug. 1, 2019", 8 pgs.
"International Application Serial No. PCT/US2017/068902, International Search Report mailed Jun. 11, 2018", 5 pgs.
"International Application Serial No. PCT/US2017/068902, Written Opinion mailed Jun. 11, 2018", 6 pgs.
"Korean Application Serial No. 10-2019-7023632, Notice of Preliminary Rejection mailed Mar. 19, 2021", w/ English Translation, 6 pgs.
"Korean Application Serial No. 10-2019-7023632, Notice of Preliminary Rejection mailed Aug. 4, 2020", w/ English Translation, 19 pgs.
"Korean Application Serial No. 10-2019-7023632, Response filed Jun. 21, 2021 to Notice of Preliminary Rejection mailed Mar. 19, 2021", w/ English Claims, 20 pgs.
"Korean Application Serial No. 10-2019-7023632, Response filed Nov. 4, 2020 to Notice of Preliminary Rejection mailed Aug. 4, 2020", w/ English Claims, 31 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

* cited by examiner

CONTENT-BASED CLIENT SIDE VIDEO TRANSCODING

CLAIM OF PRIORITY

This application is a continuation of U.S. patent application Ser. No. 18/452,016, filed Aug. 18, 2023, which application is a continuation of U.S. patent application Ser. No. 17/322,407, filed May 17, 2021, now issued as U.S. Pat. No. 11,778,209, which application is a continuation of U.S. patent application Ser. No. 15/622,336, filed Jun. 14, 2017, now issued as U.S. Pat. No. 11,019,349, which claims the benefit of priority to U.S. Provisional Application Ser. No. 62/448,465, filed on Jan. 20, 2017, and which are incorporated herein by reference in their entirety.

TECHNICAL FIELD

Embodiments of the present disclosure relate generally to techniques for automated video transcoding. More particularly, but not by way of limitation, the present disclosure addresses systems and methods for transcoding video on portable communications devices based on content of the video.

BACKGROUND

The popularity of electronic messaging, particularly instant messaging, continues to grow. Messaging applications and devices can provide communication between multiple users using a variety of media, such as text, images, sound recordings, or video recording. For example, video chatting allows two or more individuals to communicate picture images and/or video with each other using a combination of software applications, devices, and networks.

Many devices used for electronic messaging are embodied as portable communication devices, such as smartphones, tablets, and other wearables. These devices can be constrained by the quality of their components, such as the resolution of a camera, processor speed, memory size, etc. To preserve space, a device may use variable bitrate (VBR) encoding of audio and video content to produce a better quality-to-space ratio compared to a constant bitrate (CBR) encoded file of the same data. However, VBR may take more time to encode, as the process is more complex, and that some hardware might not be compatible with VBR files. Accordingly, there is still a need in the art to improve video transcoding using portable communications device.

BRIEF DESCRIPTION OF THE DRAWINGS

Various ones of the appended drawings merely illustrate exemplary embodiments of the present disclosure and should not be considered as limiting its scope.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Embodiments of the present disclosure relate to improvements in the functionality of electronic messaging and imaging software and systems. In some embodiments, but not by way of limitation, the present disclosure addresses techniques for content-based client side video transcoding, at times conserving space on mobile devices by transcoding videos with relatively good quality using a lower bitrate. The content-based client side video transcoding also at times saving bandwidth when uploading transcoded videos to a server. The content-based client side video transcoding thus improving user experience by preserving video quality and decreasing upload times.

Among other things, embodiments of present disclosure enable content-based client side video transcoding for use at a computing device. For example, video generated by an image-capturing device (e.g., a digital camera) can be analyzed and used as a guide to transcoding the video. In some embodiments, bitrate can be adjusted when the content of the video is determined to be complex (e.g., having motion that exceeds a predetermined threshold or presenting a detailed texture).

The bitrate of a predetermined transcoding configuration (whether fixed or variable) may be selected according to an average difference between one or more raw captured frames and one or more encoded frames. The bitrate of a predetermined transcoding configuration can be identified according to whether the difference exceeds a predetermined threshold, where a small difference is indicative of a simple motion or texture and a large difference indicative of a complex motion or texture. In such embodiments, the difference may be determined using a subtraction between frames, a mean square error, a peek signal to noise ratio, or other suitable difference metrics.

A. Social Messaging Client-Server Architecture

The following provides an example of an environment or system in which embodiments of the present invention may operate or otherwise be found. It will be evident, however, to those skilled in the art, that embodiments of the inventive subject matter may be practiced without these specific details.

Figure 1:
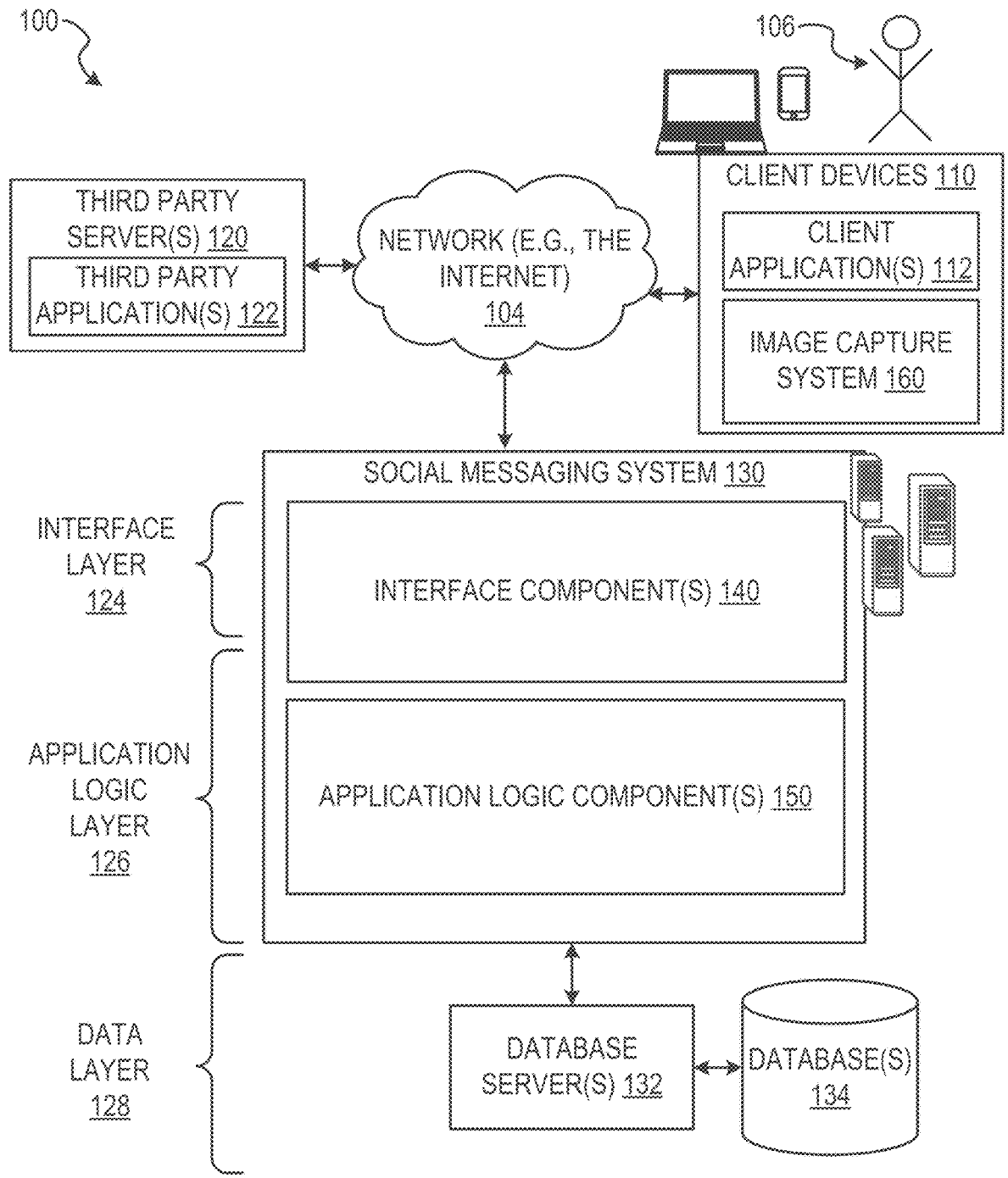
FIG. 1 is a block diagram illustrating a networked system, according to some exemplary embodiments.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of instructions, as a special purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface components (e.g., a web server) 140, which receives requests from various client-computing devices and servers, such as client devices 110 executing client application(s) 112, and third party servers 120 executing third party application(s) 122. In response to received requests, the interface component 140 communicates appropriate responses to requesting devices via a network 104. For example, the interface components 140 can receive requests such as Hypertext Transfer Protocol (HTTP) requests, or other web-based, Application Programming Interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some exemplary embodiments, the client devices 110 form all or part of an image capture system 160 such that components of the image capture system 160 configure the client device 110 to perform a specific set of functions with respect to operations of the image capture system 160. One example of image capture system 160 is described further with respect to FIG. 2. Another example of image capture system 160 is described further with respect to FIG. 3.

In an example, the client devices 110 are executing the client application(s) 112. The client application(s) 112 can provide functionality to present information to a user 106 and communicate via the network 104 to exchange information with the social messaging system 130. Further, in some examples, the client devices 110 execute functionality of the image capture system 160 to segment images of video streams during capture of the video streams and transmit the video streams (e.g., with image data modified based on the segmented images of the video stream).

Each of the client devices 110 can comprise a computing device that includes at least a display and communication capabilities with the network 104 to access the social messaging system 130, other client devices, and third party servers 120. The client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client devices 110. In some embodiments, the user 106 interacts with the social messaging system 130 via the client devices 110. The user 106 may not be part of the networked environment, but may be associated with the client devices 110.

As shown in FIG. 1, the data layer 128 has database servers 132 that facilitate access to information storage repositories or databases 134. The databases 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface components 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

The social messaging system 130 may include at least a portion of the image capture system 160 capable of prioritizing delivery of image modifiers for captured data to the client device 110. The image capture system 160 may additionally identify and track usage of image modifiers by a user of the client device 110. Similarly, the client device 110 includes a portion of the image capture system 160, as described above. In other examples, client device 110 may include the entirety of image capture system 160. In instances where the client device 110 includes a portion of (or all of) the image capture system 160, the client device 110 can work alone or in cooperation with the social messaging system 130 to provide the functionality of the image capture system 160 described herein.

In some embodiments, the social messaging system 130 may be an ephemeral message system that enables ephemeral communications where content (e.g. video clips or images) are deleted following a deletion trigger event such as a viewing time or viewing completion. In such embodiments, a device uses the various components described herein within the context of any of generating, sending, receiving, or displaying aspects of an ephemeral message. For example, a device implementing the image capture system 160 may capture or otherwise receive a media content item. The device may modify the media content item with one or more image modifiers as a part of a generation of content for an ephemeral message.

Figure 2:
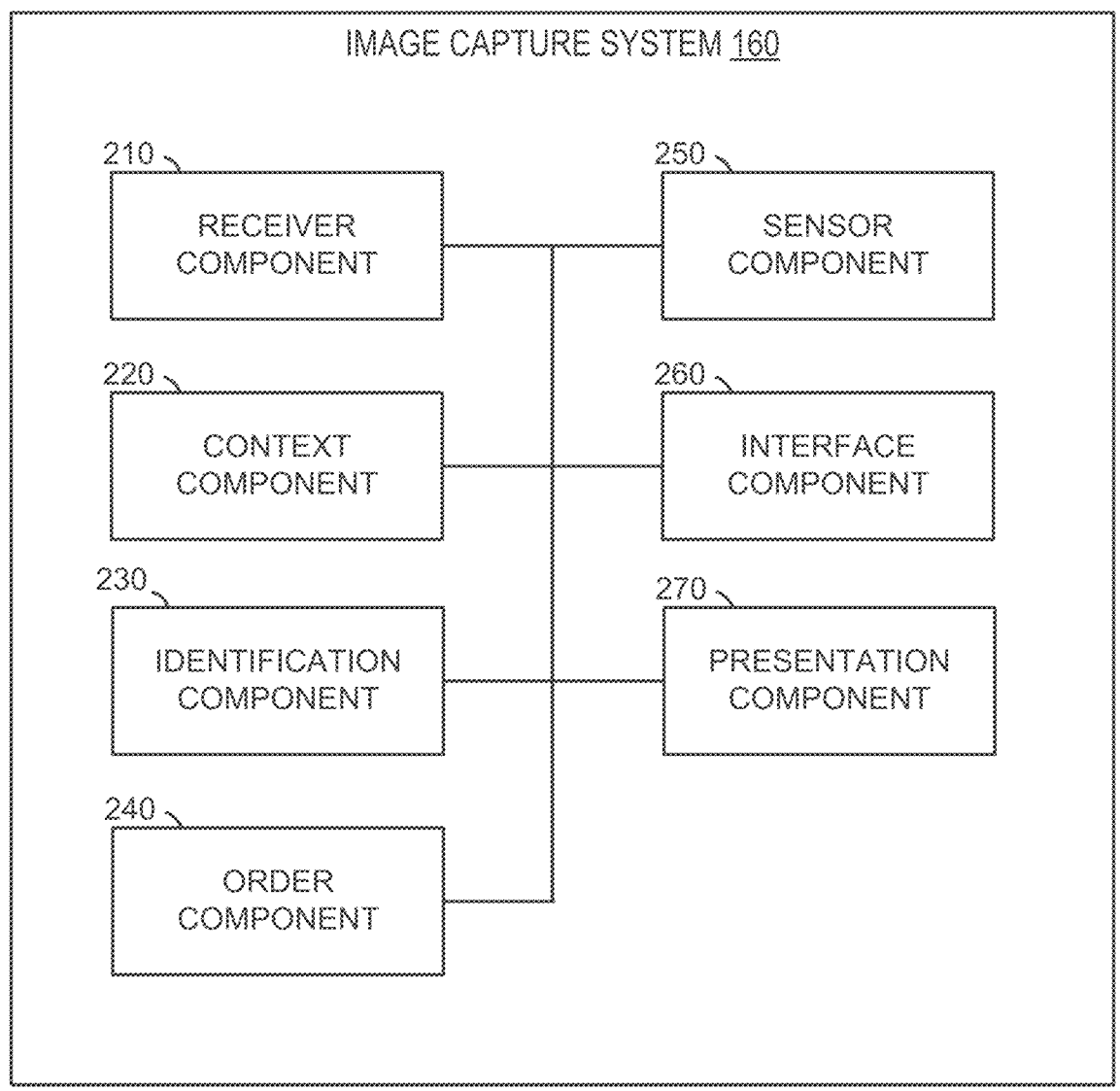
FIG. 2 is a diagram illustrating an image capture system, according to some exemplary embodiments.

In FIG. 2, in various embodiments, the image capture system 160 of FIG. 1 can be implemented as a standalone system or implemented in conjunction with the client device 110, and is not necessarily included in the social messaging system 130. The image capture system 160 is shown to include a receiver component 210, a context component 220, an identification component 230, an order component 240, a sensor component 250, an interface component 260, and a presentation component 270. All, or some, of the components 210-270, communicate with each other, for example, via a network coupling, shared memory, and the like. Each component of components 210-270 can be implemented as a single component, combined into other components, or further subdivided into multiple components. Other components not pertinent to exemplary embodiments can also be included, but are not shown.

Figure 3:
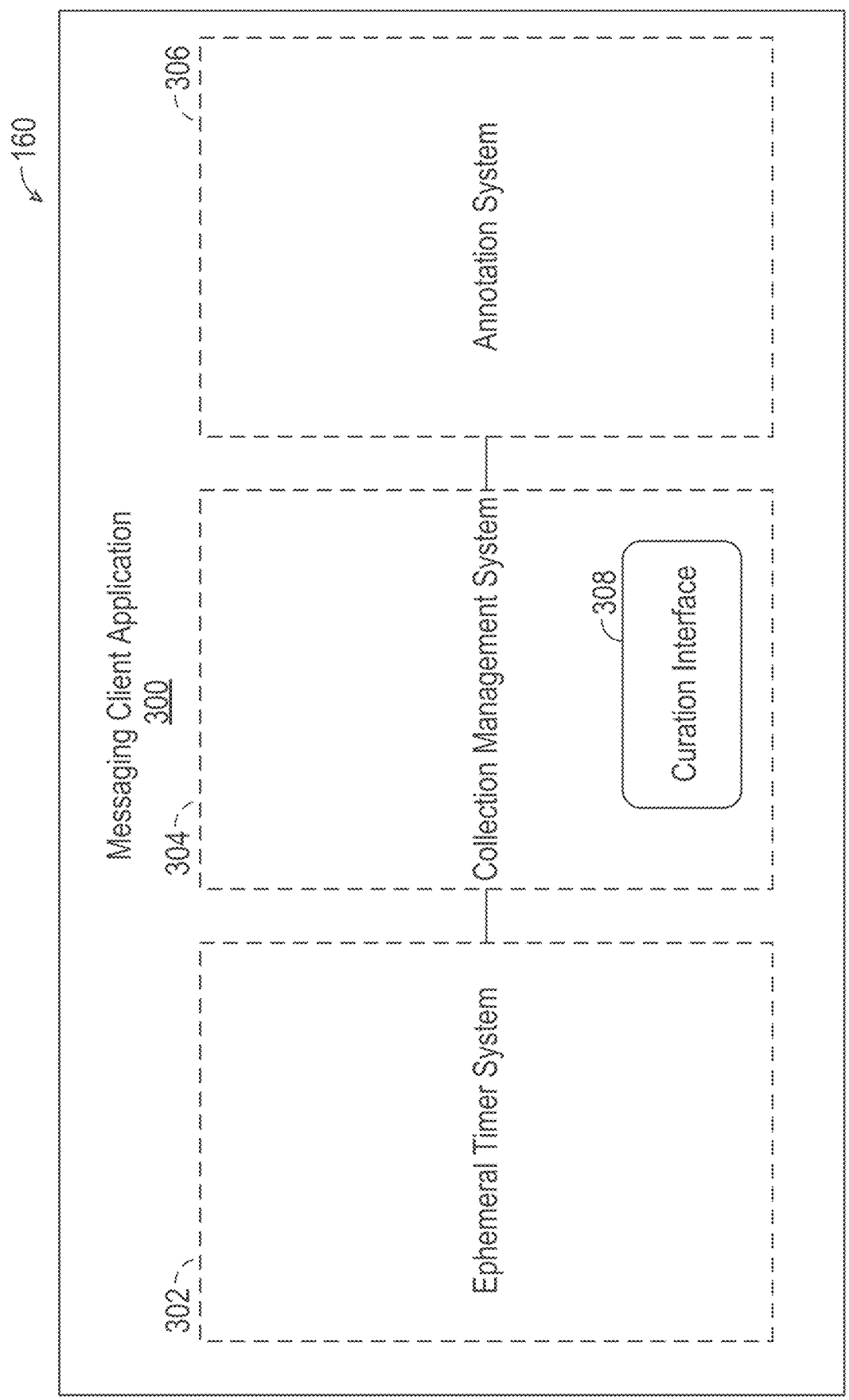
FIG. 3 is block diagram illustrating further details regarding an image capture system, according to exemplary embodiments.

FIG. 3 is block diagram illustrating further details regarding image capture system 160, according to exemplary embodiments. Specifically, image capture system 160 is shown to comprise messaging client application 300, which in turn embody a number of some subsystems, namely an ephemeral timer system 302, a collection management system 304 and an annotation system 306.

Ephemeral timer system 302 includes hardware and/or software elements responsible for enforcing the temporary access to content permitted by the messaging client application 300 and the social messaging system 130. To this end, the ephemeral timer system 302 incorporates a number of timers that, based on duration and display parameters associated with a message, or collection of messages (e.g., a SNAPCHAT story), selectively display and enable access to messages and associated content via the messaging client application 300.

Collection management system 304 includes hardware and/or software elements responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 304 may also be responsible for publishing an icon that provides notification of the existence of a particular collection to the user interface of the messaging client application 300.

Collection management system 304 furthermore includes the curation interface 308 that allows a collection manager to manage and curate a particular collection of content. For example, the curation interface 308 enables an event organizer to curate a collection of content relating to a specific event (e.g., delete inappropriate content or redundant messages). Additionally, the collection management system 304 employs machine vision (or image recognition technology) and content rules to automatically curate a content collection. In certain embodiments, compensation may be paid to a user for inclusion of user generated content into a collection. In such cases, the curation interface 308 operates to automatically make payments to such users for the use of their content.

Annotation system 306 includes hardware and/or software elements that provide various functions that enable a user to annotate or otherwise modify or edit media content associated with a message. For example, the annotation system 306 provides functions related to the generation and publishing of image modifiers for messages processed by social messaging system 130. The annotation system 306 operatively supplies an image modifier (e.g., a SNAPCHAT filter) to the messaging client application 300, for example, based on a geolocation of the client device 110. In another example, the annotation system 306 operatively supplies an image modifier to the messaging client application 300 based on other information, such as, social network information of the user of the client device 110. In embodiments, the annotation system 306 operatively supplies organizes a collection of image modifiers for the messaging client application 300 based on predetermined criteria, such as whether an image modifier a set of rules defining a category, specifying usage requirements, location limitations, sponsorship, and the like.

In general, an image modifier may include audio and visual content and visual effects. Examples of audio and visual content include pictures, texts, logos, animations, and sound effects. An example of a visual effect includes color overlaying. The audio and visual content or the visual effects can be applied to a media content item (e.g., an image or video) at the client device 110. For example, the image modifier including text that can be overlaid on top of a photograph/electronic image generated by the client device 110. In another example, the image modifier includes an identification of a location overlay (e.g., Venice beach), a name of a live event, or a name of a merchant overlay (e.g., Beach Coffee House). In another example, annotation system 306 uses the geolocation of the client device 110 to identify an image modifier that includes the name of a merchant at the geolocation of the client device 110. The image modifier may include other indicia associated with the merchant. The image modifiers may be stored in the databases 134 and accessed through the database servers 132.

In one exemplary embodiment, the annotation system 306 provides a publication platform that enables publishers to select a geolocation on a map and upload content associated with the selected geolocation. A publisher may also specify circumstances under which the particular image modifier should be offered to users of messaging client application 300. The annotation system 306 generates an image modifier that includes the uploaded content and associates the uploaded content with the selected geolocation.

Figure 4:
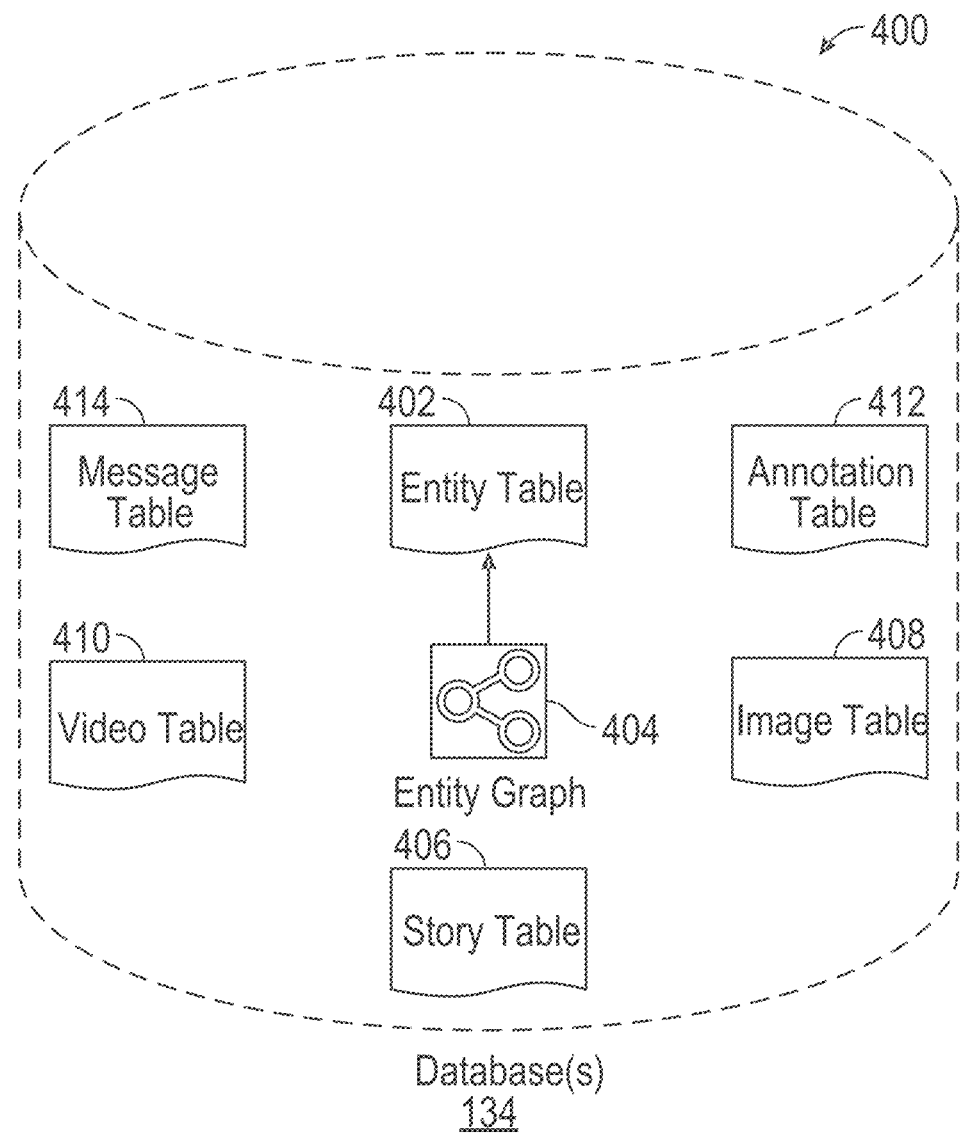
FIG. 4 is a schematic diagram illustrating data which may be stored in the database of the messaging server system, according to various exemplary embodiments.

In another exemplary embodiment, the annotation system 306 provides a publication platform that enables merchants to select a particular image modifier associated with a geolocation via a bidding process. For example, the annotation system 306 associates the image modifier of a highest bidding merchant with a corresponding geolocation for a predefined amount of time FIG. 4 is a schematic diagram 400 illustrating data 400 which may be stored in the database(s) 134 of the social messaging system 130, according to certain exemplary embodiments. While the content of database(s) 134 is shown to comprise a number of tables, it will be appreciated that the data could be stored in other types of data structures (e.g., as an object-oriented database).

In this example, database(s) 134 includes message data stored within a message table 414. The entity table 402 stores entity data, including an entity graph 404. Entities for which records are maintained within the entity table 402 may include individuals, corporate entities, organizations, objects, places, events etc. Regardless of type, any entity regarding which social messaging system 130 stores data may be a recognized entity. Each entity is provided with a unique identifier, as well as an entity type identifier (not shown).

The entity graph 404 furthermore stores information regarding relationships and associations between entities. Such relationships may be social, professional (e.g., work at a common corporation or organization) interested-based or activity-based, merely for example.

Database(s) 134 also stores annotation data, in the example form of image modifiers (also known herein as filters), in an annotation table 412. Filters for which data is stored within the annotation table 412 are associated with and applied to videos (for which data is stored in a video table 410) and/or images (for which data is stored in an image table 408). Filters, in one example, are media overlays that are displayed as overlaid on an image or video during presentation to a recipient user. Filters may be organized, including a prioritize listing of filters from a gallery of filters presented to a sending user by the messaging client application 300 when the sending user is composing a message.

Filters may be of varies types. Other types of filers include geolocation filters (also known as geo-filters) which may be presented to a sending user based on geographic location. For example, geolocation filters specific to a neighborhood or special location may be presented within a user interface by the messaging client application 300, based on geolocation information determined by a GPS unit of the client device 110. Another type of filer is a data filer, which may be selectively presented to a sending user by the messaging client application 300, based on other inputs or information gathered by the client device 110 during the message creation process. Examples of data filters include current temperature at a specific location, a current speed at which a sending user is traveling, battery life for a client device 110 or the current time.

Other annotation data that may be stored within the image table 408 is so-called "lens" data. A "lens" may be a real-time special effect and sound that may be added to an image or a video.

As mentioned above, the video table 410 stores video data which, in one embodiment, is associated with messages for which records are maintained within the message table 414. Similarly, the image table 408 stores image data associated with messages for which message data is stored in the entity table 402. The entity table 402 may associate various annotations from the annotation table 412 with various images and videos stored in the image table 408 and the video table 410.

A story table 406 stores data regarding collections of messages and associated image, video or audio data, which are compiled into a collection (e.g., a SNAPCHAT story or a gallery). The creation of a particular collection may be initiated by a particular user (e.g., each user for which a record is maintained in the entity table 402). A user may create a "personal story" in the form of a collection of content that has been created and sent/broadcast by that user. To this end, the user interface of the messaging client application 300 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 300, to contribute content to a particular live story. The live story may be identified to the user by the messaging client application 300, based on his or her location. The end result is a "live story" told from a community perspective.

A further type of content collection is known as a "location story", which enables a user whose client device 110 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Embodiments of the present disclosure may generate and present customized images or videos for use within electronic messages/communications such as short message service (SMS) or multimedia message service (MMS) texts and emails. The customized images and videos may also be utilized in conjunction with the SNAPCHAT stories, SNAPCHAT filters, and ephemeral messaging functionality discussed herein.

In this example, database(s) 134 can also store mappings between image and video quality metrics and a transcoding configuration. The transcoding configuration can include a predetermined fixed or variable bitrate to be used when transcoding video data measured to have a corresponding quality metric value. Some examples of algorithms used to determine quality metrics can include objective and subjective metrics, such as a pixel subtraction difference, mean squared error (MSE), Peek Signal-to-Noise Ration (PSNR), and the like.

B. Content-Based Video Transcoding

With respect to generating and presenting customized images or videos for use within electronic messages/communications, embodiments of the present disclosure relate to techniques for content-based client side video transcoding. Among other things, embodiments of present disclosure enable content-based client side video transcoding for use at a computing device. For example, video data generated with image capture device 160 can be analyzed and the quality quantified using one or more metrics. One or more quality metrics can be used as a guide to transcoding the video data for use with social messaging system 130.

In various embodiments, an appropriate bitrate for transcoded video data can be selected when the content of the video is determined to be complex (e.g., having motion that exceeds a predetermined threshold or presenting a detailed texture). This allows a higher bitrate to more appropriately capture the motion or texture. An appropriate bitrate can be selected when little motion or complex textures are present to allow a lower bitrate when transcoding.

Figure 5:
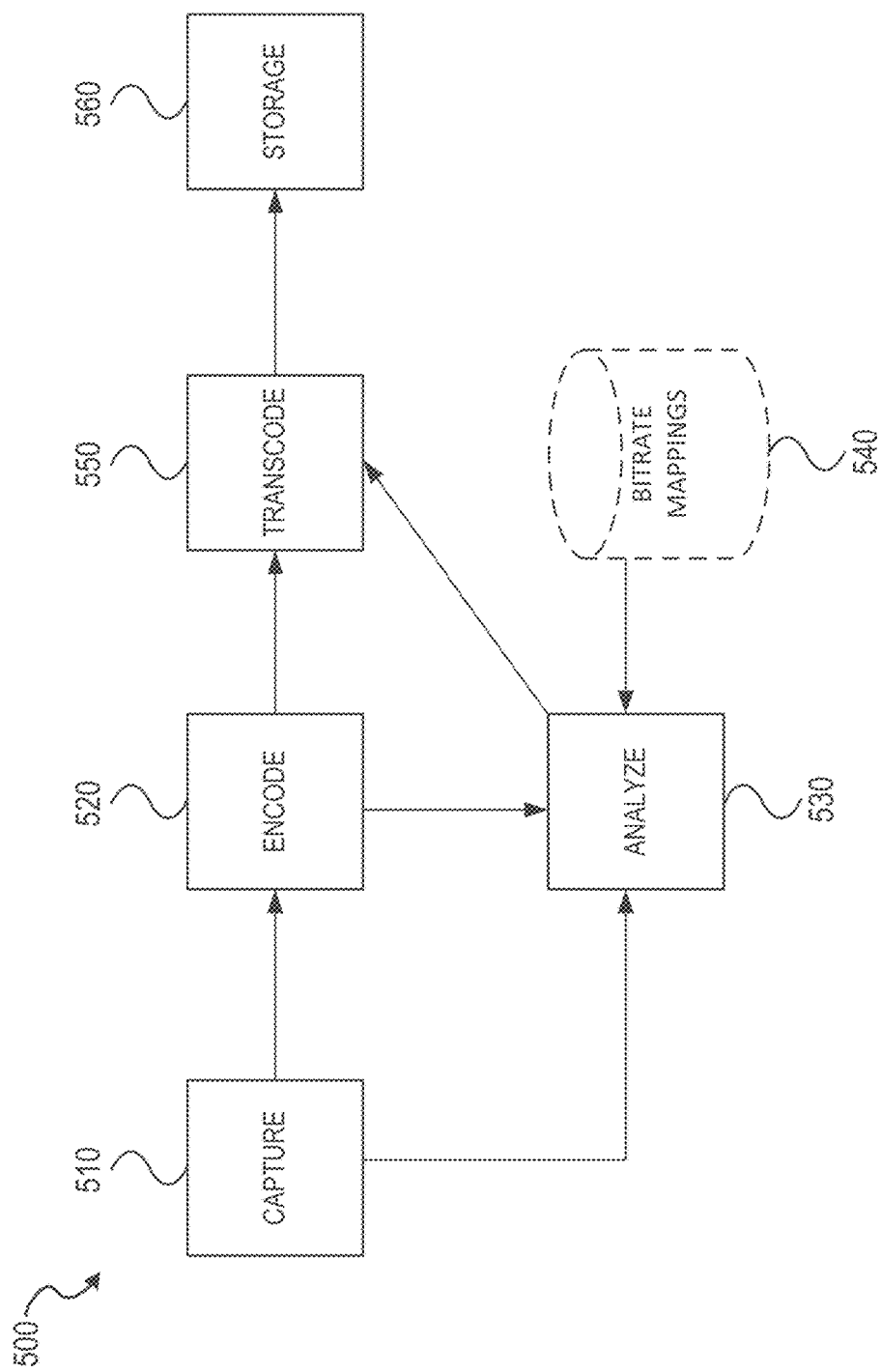
FIG. 5 is a block diagram illustrating an exemplary flow for content-based client-side video transcoding, according to some exemplary embodiments.

FIG. 5 depicts a block diagram illustrating an example flow 500 for content-based client-side video transcoding, according to some exemplary embodiments. In some embodiments, image capture system 160 presents a preview of a field of view as video data within a user interface. Image capture system 160 can enable a user to initiate capture the video data using one or more user interactions with the user interface. The image capture system 160 may use information gathered from analyzing the video data to determine how to transcode the video data for use with social messaging system 130. In these embodiments, the image capture system 160 attempts to analyze the content of the video data anticipating an appropriate transcoding configuration. The operations of method 500 may be performed by components of the image capture system 160, and are so described for purposes of illustration.

In operation 510, image capture system 160 captures raw video data. Image capture system 160 can capture the raw video data from a variety of sources. In this context, the raw video data may include any type of captured video data in any format, such as uncompressed or compressed. In some cases, the raw video data may not include compression artifacts due to losses in compression. In some exemplary embodiments, the raw video data is captured by image capture system 160 using an image capture device. Additionally or alternatively, the raw video data may be received from another system or device. The raw video data is also utilized in operation 530. Various embodiments operate according to an input buffer that holds a predetermined number of raw video frames to be encoded (e.g., 2-50 frames).

In operation 520, image capture system 160 encodes the raw video data as encoded video data. Some examples of encoded video data include the results of lossless and lossy video compression. The encoded video data is also utilized in operation 530. Various embodiments operate according to an output buffer that holds a predetermined number of encoded video frames (e.g., 2-50 frames).

In operation 530, image capture system 160 analyzes the raw video data and the encoded video data. Components of image capture system 160 make one or more determinations to quantify the complexity of the video data. Image capture system 160 may take into account how the raw video data differs from the encoded video data. How the raw video data and the encoded video data differs can be indicative of motion within the field of view of a capture device, textures that provide intricacies or complex details, or the like.

The manner in which the raw video data differs from the encoded video data may be used by the system to configure a transcoding phase. The image capture system 160 may select a transcoding configuration that applies an appropriate bitrate (e.g., fixed or variable) during a transcoding process. This can provide greater bitrate for complex motions and textures improving the quality of the transcoded video data while less bitrate is spent on videos with relatively simple motions or textures. In various embodiments, the overall bitrate can be capped to ensure that video segments remain suitable for use with social messaging system 130.

Accordingly, in operation 540, components of image capture system 160 may identify bitrate (BR) mappings that correspond to a given video quality metric. The image capture system 160 may provide the mappings for use in operation 550. As discussed above, the BR mappings can be stored in database 134 allowing consistent content-based transcoding across clients accessing social messaging system 130.

In operation 550, components of image capture system 160 can transcode the encoded video data according to a predetermined transcoding profile to generate transcoded video data at a predetermined bitrate. In operation 560, components of image capture system 160 can store the transcoded video data in a storage device.

Figure 6:
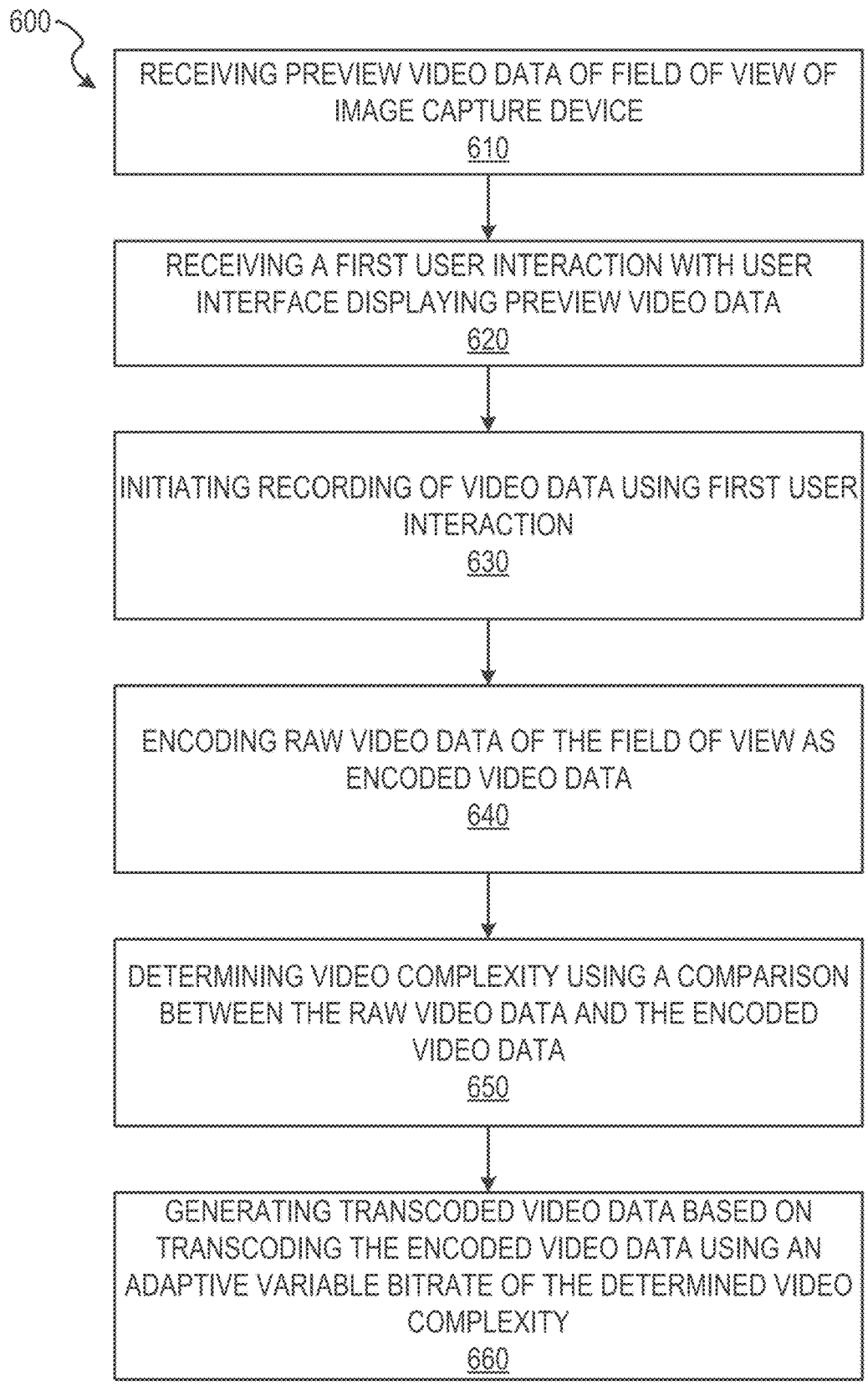
FIG. 6 is a flow diagram illustrating an exemplary method for content-based client-side video transcoding, according to some exemplary embodiments.

FIG. 6 is a flow diagram illustrating an exemplary method 600 for content-based client-side video transcoding, according to some exemplary embodiments. In some embodiments, method 600 may be performed by image capture system 160. In other embodiments, method 600 may be implemented as computer readable instructions that, when executed by processors of a computer, cause the computer to perform method 600. Various embodiments may be implemented in any fashion described herein. Additionally, it will be apparent that certain operations may be repeated, reordered, or may have other operations performed between the described operations, while still functioning in accordance with the content-based client side video transcoding embodiments described herein.

In method 600, operation 610 includes receiving preview video data of a field of view of an image capture device. The preview video data may include raw video data, compressed video data, encoded video data, or the like. The preview video data may include additional overlays, enhancements, processing, and the like. The preview video data may be displayed on a display screen of a computing device performing some or all of the functionality of method 600.

Operation 620 involves receiving a first user interaction with a user interface displaying the preview data. For example, where the user interface includes a touchscreen upon which the preview video data is displayed, the first user interaction can include a touch, a swipe, a gesture, or the like. Operation 630 involves initiating a recording of video data using the first use interaction. In one embodiment, a user touches a record button displayed within the user interface to initiate recording of a video message. Subsequent user interactions may likewise be provided through the touchscreen or another suitable input device of a user interface.

Operation 640 involves encoding raw video data of the field of view as encoded video data. The raw video data can include uncompressed video data received from a variety of sources. The encoded video data can include uncompressed or compressed video data. Compressed video data can include lossless and lossy compression artifacts. Operation

640 may involve encoding video data frame by frame, encoding video data using a collection of frames, or the like.

Operation 650 involves determining video complexity using a comparison between the raw video data and the encoded video data. In various embodiments, image capture device 160 may access the raw video data captured by a capture device and the encoded video data encoded by a hardware or software encoder. Image capture device 160 may convert one or more frames of the encoded video data for comparison to one or more corresponding frames of the raw video data. Image capture device 160 may convert (e.g., decode) an encoded video frame to a pixel frame and perform one or more subtraction operations with a corresponding frame of the raw video data.

In one aspect, image capture device 160 may select from one or more difference metrics to quantify differences between the raw video data and the encoded video data. In one embodiment, image capture device 160 may perform a subtraction operation. The subtraction operation may result in a small determined difference between the two frames. The small difference may indicate that the content of the video data is relatively simple. For example, the content of the video data may be of a static background with relatively little motion, little object detail, etc., thereby having a simple content configuration. In another example, compression artifacts present in the encoded video data may result in a large difference between the two frames after subtraction. The large difference may indicate that the content of the video data is relatively complex (e.g., having a complex motion or detailed texture disturbed during the encoding process). Image capture device 160 may average the difference of several frames to determine the complexity of the content of the video data.

In another embodiment, image capture device 160 may determine a mean squared error (MSE) and/or a peek signal to noise ratio between the raw video data and the encoded video data. A lower noise ratio may indicate that the content of the video data does not include any complex motion or textures. A higher noise ration may indicate that the content of the video data does include motion or complex textures. In another embodiment, image capture device 160 may determine a mean square error between the raw video data and the encoded video data. A lower noise ratio may indicate that the content of the video data does not include any complex motion or textures. A higher noise ration may indicate that the content of the video data does include motion or complex textures.

Operation 660 involves generating transcoded video data based on transcoding the encoded video data using a bitrate corresponding to the determined video complexity. In various embodiments, complexity can be mapped to one or more transcoding configurations, each have a predetermined fixed or variable bitrate setting. The image capture device 160 may select an appropriate transcoding configuration for the encoded video data utilizing the determined complexity as a seed. The image capture device 160 can thereby optimize bandwidth usage for videos with less motions and simpler textures.

The image capture device 160 can further adjust the bitrate base on the content complexity, helping achieve consistent video quality across all videos uploaded to social messaging system 130 from various users. Generally, more bitrate can be spent on videos with relatively bad quality, and less bitrate is spent on the videos with relatively good quality. Additionally, the image capture device 160 can cap the bitrate to make sure a total video package is under a maximum upload limit.

C. Modules, Components, and Logic

Certain embodiments are described herein as including logic or a number of components, modules, or mechanisms. Components can constitute hardware components. A "hardware component" is a tangible unit capable of performing certain operations and can be configured or arranged in a certain physical manner. In various exemplary embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of exemplary methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some exemplary embodiments, the processors or processor-implemented components are located in a single geographic location (e.g., within a home environment, an office environment, or a server farm). In other exemplary embodiments, the processors or processor-implemented components are distributed across a number of geographic locations.

D. Applications

Figure 7:
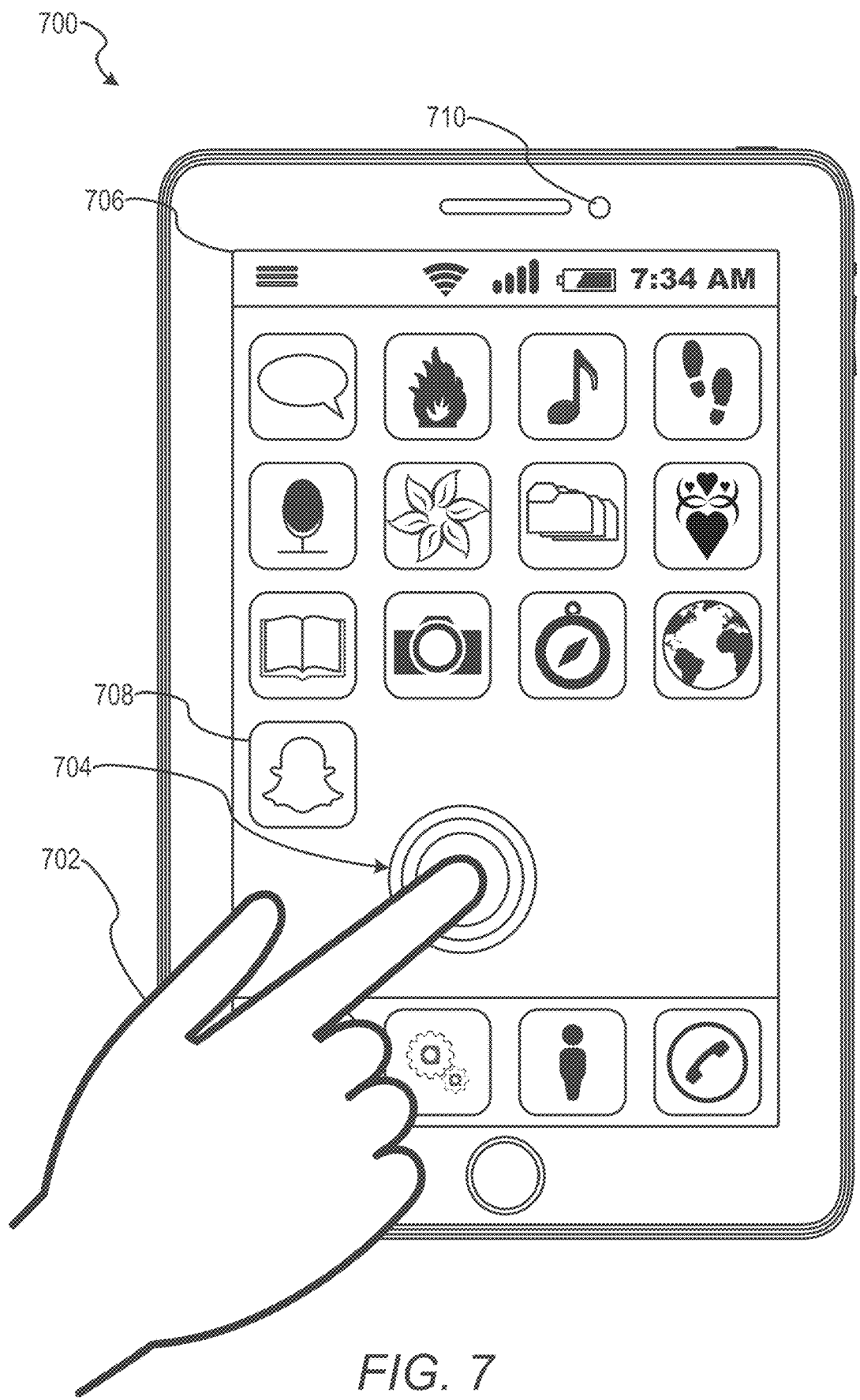
FIG. 7 illustrates an exemplary mobile device executing a mobile operating system (e.g., IOS™, ANDROID™, WINDOWS® Phone, or other mobile operating systems), consistent with some embodiments.

FIG. 7 illustrates an exemplary mobile device 700 executing a mobile operating system (e.g., IOS™, ANDROID™, WINDOWS® Phone, or other mobile operating systems), consistent with some embodiments. In one embodiment, the mobile device 700 includes a touch screen operable to receive tactile data from a user 702. For instance, the user 702 may physically touch 704 the mobile device 700, and in response to the touch 704, the mobile device 700 may determine tactile data such as touch location, touch force, or gesture motion. In various exemplary embodiments, the mobile device 700 displays a home screen 706 (e.g., Springboard on IOS™) operable to launch applications or otherwise manage various aspects of the mobile device 700. In some exemplary embodiments, the home screen 706 provides status information such as battery life, connectivity, or other hardware statuses. The user 702 can activate user interface elements by touching an area occupied by a respective user interface element. In this manner, the user 702 interacts with the applications of the mobile device 700. For example, touching the area occupied by a particular icon included in the home screen 706 causes launching of an application corresponding to the particular icon.

The mobile device 700, as shown in FIG. 7, includes an imaging device 708. The imaging device may be a camera or any other device coupled to the mobile device 700 capable of capturing a video stream or one or more successive images. The imaging device 708 may be triggered by the image capture system 160 or a selectable user interface element to initiate capture of a video stream or succession of frames and pass the video stream or succession of images to the image capture system 160 for processing according to the one or more methods described in the present disclosure.

Many varieties of applications (also referred to as "apps") can be executing on the mobile device 700, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 700 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 700 includes a social messaging app 710 such as SNAPCHAT® that, consistent with some embodiments, allows users to exchange ephemeral messages that include media content. In this example, the social messaging app 710 can incorporate aspects of embodiments described herein. For example, in some embodiments the social messaging application includes an ephemeral gallery of media created by users the social messaging application. These galleries may consist of videos or pictures posted by a user and made viewable by contacts (e.g., "friends") of the user. Alternatively, public galleries may be created by administrators of the social messaging application consisting of media from any users of the application (and accessible by all users). In yet another embodiment, the social messaging application may include a "magazine" feature which consists of articles and other content generated by publishers on the social messaging application's platform and accessible by any users. Any of these environments or platforms may be used to implement concepts of the present invention.

In some embodiments, an ephemeral message system may include messages having ephemeral video clips or images which are deleted following a deletion trigger event such as a viewing time or viewing completion. In such embodiments, a device implementing the image capture system 160 may identify, track, extract, and generate representations of a face within the ephemeral video clip, as the ephemeral video clip is being captured by the device and transmit the ephemeral video clip to another device using the ephemeral message system.

E. Software Architecture

Figure 8:
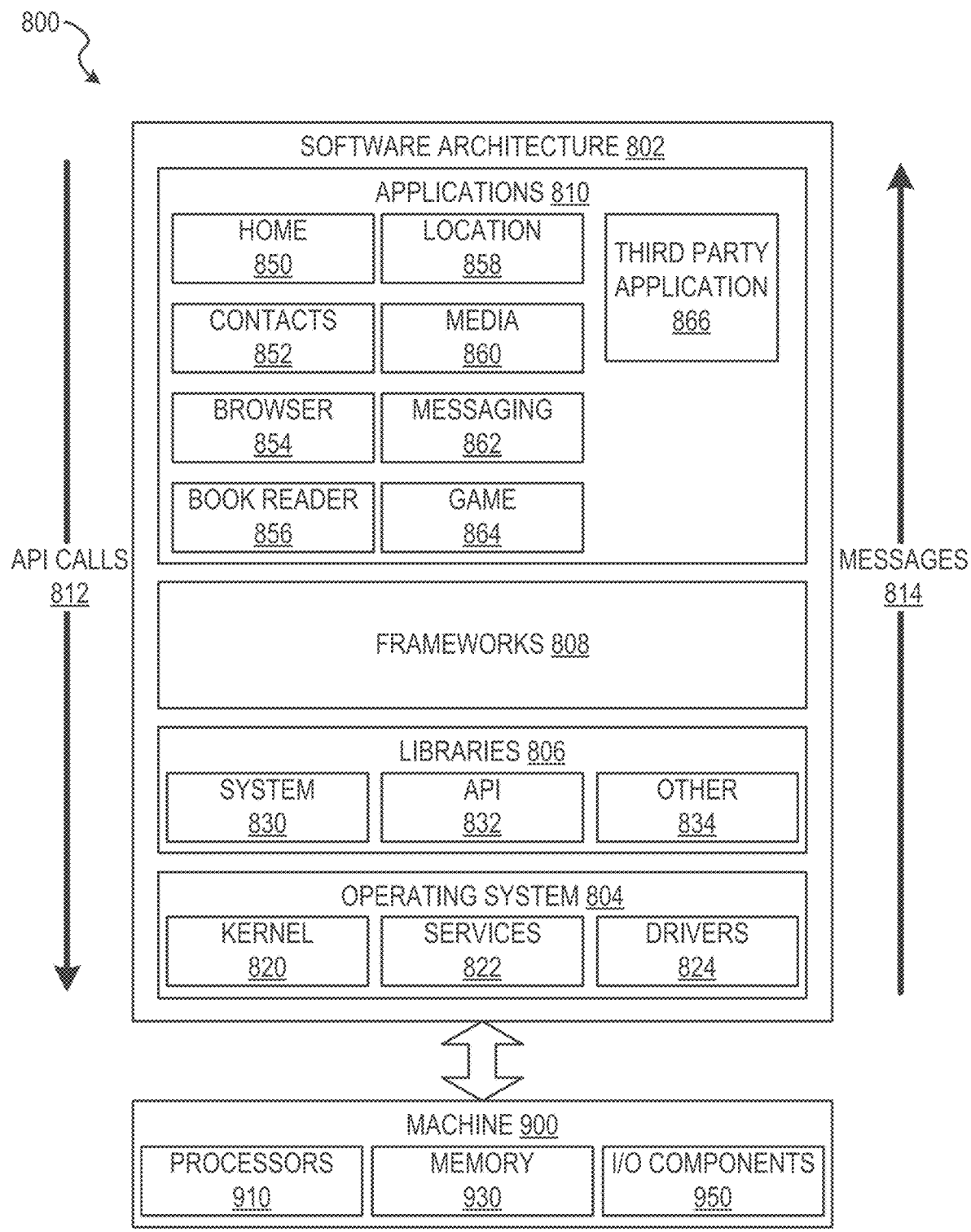
FIG. 8 is a block diagram illustrating an example of a software architecture that may be installed on a machine, according to some exemplary embodiments.

FIG. 8 is a block diagram 800 illustrating an architecture of software 802, which can be installed on the devices described above. FIG. 8 is merely a non-limiting example of a software architecture, and it will be appreciated that many other architectures can be implemented to facilitate the functionality described herein. In various embodiments, the software 802 is implemented by hardware such as machine a 900 of FIG. 9 that includes processors 910, memory 930, and I/O components 950. In this exemplary architecture, the software 802 can be conceptualized as a stack of layers where each layer may provide a particular functionality. For example, the software 802 includes layers such as an operating system 804, libraries 806, frameworks 808, and applications 810. Operationally, the applications 810 invoke application programming interface (API) calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphic user interface (GUI) functions, high-level resource management, high-level location services, and so forth. The frameworks 808 can provide a broad spectrum of other APIs that can be utilized by the applications 810, some of which may be specific to a particular operating system or platform.

In an exemplary embodiment, the applications 810 include a home application 850, a contacts application 852, a browser application 854, a book reader application 856, a location application 858, a media application 860, a messaging application 862, a game application 864, and a broad assortment of other applications such as a third party application 866. According to some embodiments, the applications 810 are programs that execute functions defined in the programs. Various programming languages can be employed to create the applications 810, structured in a variety of manners, such as object-oriented programming languages (e.g., Objective-C, Java, or C++) or procedural programming languages (e.g., C or assembly language). In a specific example, the third party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third party application 866 can invoke the API calls 812 provided by the operating system 804 to facilitate functionality described herein.

F. Exemplary Machine Architecture and Machine-Readable Medium

Figure 9:
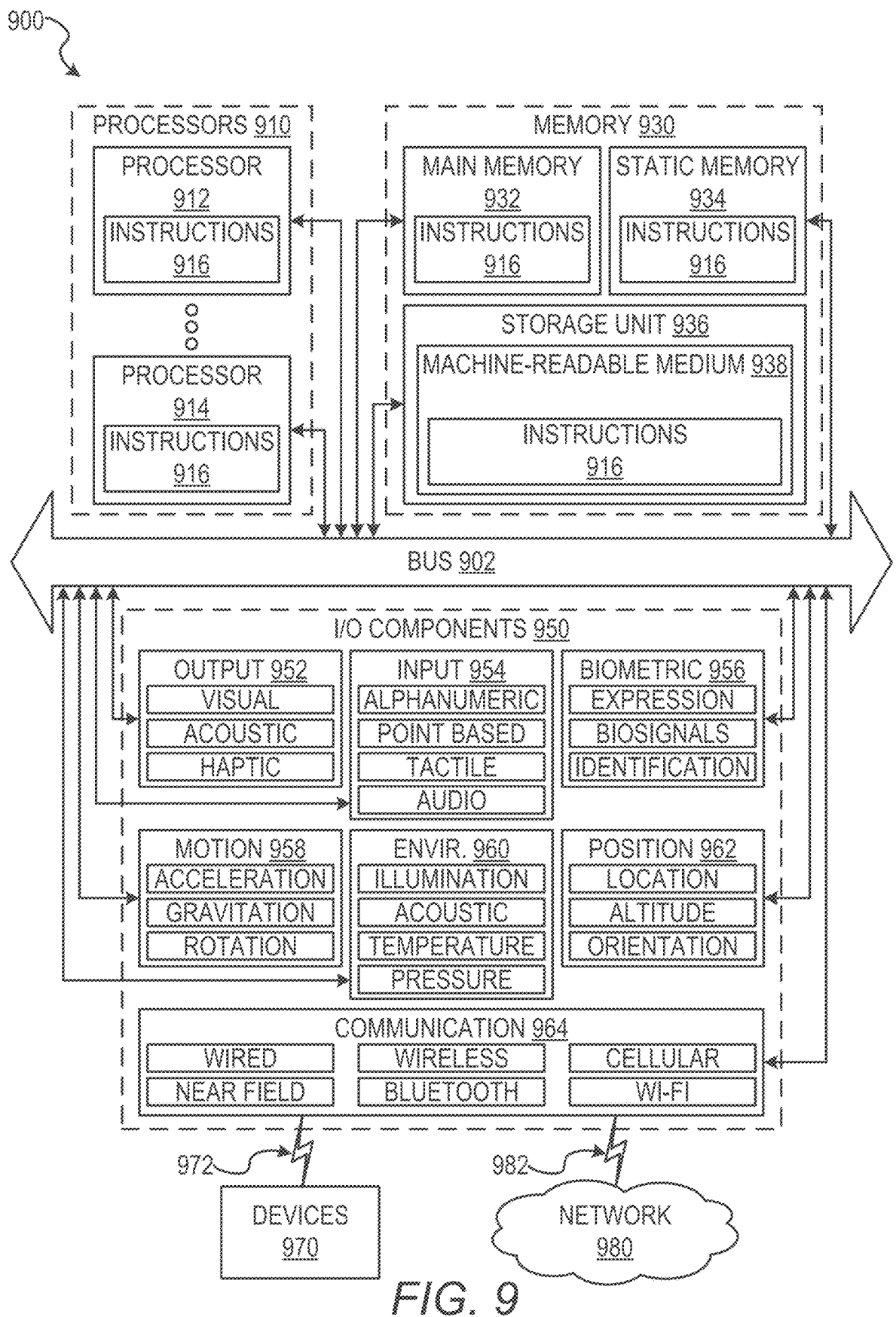
FIG. 9 is a block diagram presenting a diagrammatic representation of a machine in the form of a computer system within which a set of instructions may be executed for causing the machine to perform any of the methodologies discussed herein, according to an exemplary embodiment.

FIG. 9 is a block diagram illustrating components of a machine 900, according to some embodiments, able to read instructions (e.g., processor executable instructions) from a machine-readable medium (e.g., a non-transitory processor-readable storage medium or processor-readable storage device) and perform any of the methodologies discussed herein. Specifically, FIG. 9 shows a diagrammatic representation of the machine 900 in the exemplary form of a computer system, within which instructions 916 (e.g., software, a program, an application, an applet, an app, or other executable code) for causing the machine 900 to perform any of the methodologies discussed herein can be executed. In alternative embodiments, the machine 900 operates as a standalone device or can be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any of the methodologies discussed herein.

In various embodiments, the machine 900 comprises processors 910, memory 930, and I/O components 950, which can be configured to communicate with each other via a bus 902. In an exemplary embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 912 and a processor 914 that may execute the instructions 916. The term "processor" is intended to include multi-core processors that may comprise two or more independent processors (also referred to as "cores") that can execute instructions contemporaneously. Although FIG. 9 shows multiple processors, the machine 900 may include a single processor with a single core, a single processor with multiple cores (e.g., a multi-core processor), multiple processors with a single core, multiple processors with multiples cores, or any combination thereof.

The memory 930 comprises a main memory 932, a static memory 934, and a storage unit 936 accessible to the processors 910 via the bus 902, according to some embodiments. The storage unit 936 can include a machine-readable medium 938 on which are stored the instructions 916 embodying any of the methodologies or functions described herein. The instructions 916 can also reside, completely or at least partially, within the main memory 932, within the static memory 934, within at least one of the processors 910 (e.g., within the processor's cache memory), or any suitable combination thereof, during execution thereof by the machine 900. Accordingly, in various embodiments, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown in an exemplary embodiment to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions, when executed by processors of the machine 900 (e.g., processors 910), cause the machine 900 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 can include many other components that are not shown in FIG. 9. The I/O components 950 are grouped according to functionality merely for simplifying the following discussion, and the grouping is in no way limiting. In various exemplary embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further exemplary embodiments, the I/O components 950 include biometric components 956, motion components 958, environmental components 960, or position components 962, among a wide array of other components. For example, the biometric components 956 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 include acceleration sensor components (e.g., accelerometer), gravitation sensor components, rotation sensor components (e.g., gyroscope), and so forth. The environmental components 960 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 962 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, communication components 964 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 970 may be another machine or any of a wide variety of peripheral devices (e.g., a peripheral device coupled via a Universal Serial Bus (USB)).

Moreover, in some embodiments, the communication components 964 detect identifiers or include components operable to detect identifiers. For example, the communication components 964 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 964, such as location via Internet Protocol (IP) geolocation, location via WI-FI® signal triangulation, location via detecting a BLUETOOTH® or NFC beacon signal that may indicate a particular location, and so forth.

G. Transmission Medium

In various exemplary embodiments, portions of the network 980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 4G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In exemplary embodiments, the instructions 916 are transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, in other exemplary embodiments, the instructions 916 are transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Furthermore, the machine-readable medium 938 is non-transitory (in other words, not having any transitory signals) in that it does not embody a propagating signal. However, labeling the machine-readable medium 938 "non-transitory" should not be construed to mean that the medium is incapable of movement; the medium should be considered as being transportable from one physical location to another. Additionally, since the machine-readable medium 938 is tangible, the medium may be considered to be a machine-readable device.

H. Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific exemplary embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
    a processor;
    a user interface coupled to the processor, the user interface comprising an image capture device; and
    memory coupled to the processor and storing instructions that, when executed by the processor, cause the system to perform operations comprising:
    determining a complexity between at least two frames of captured video data, the captured video data including a field of view;
    determining a particular bitrate that corresponds to a video quality metric for the complexity determined between the at least two frames; and
    selecting a transcoding configuration that applies the particular bitrate among a plurality of bitrates to the video data causing generation of transcoded video data using the particular bitrate.

2. The system of claim 1, wherein determining a complexity includes determining the complexity within the field of view of the image capture device.

3. The system of claim 1, further comprising: generating the transcoded video data based on the selected transcoded configuration.

4. The system of claim 1, wherein the transcoding configuration is selected from a plurality of transcoding configurations of varying bitrates.

5. The system of claim 1, wherein the bitrate applied to the transcoded video is selected to correspond to a video quality metric.

6. The system of claim 5, wherein the bitrate applied is based on predefined mappings between at least one video quality metric and the transcoding configuration.

7. The system of claim 1, wherein determining the complexity within the field of view of the image capture device includes detecting motion within the field of view.

8. The system of claim 7, wherein determining the complexity within the field of view of the image capture device includes determining that the detected motion exceeds a predetermined threshold.

9. The system of claim 1, wherein determining the complexity within the field of view of the image capture device includes detecting a texture within the field of view.

10. The system of claim 1, wherein determining the complexity within the field of view of the image capture device includes determining an average difference between a plurality of frames in the captured video data and a plurality of frames in the video data.

11. The system of claim 1, wherein determining the complexity within the field of view of the image capture device includes determining a square error between a plurality of frames in the captured video data and a plurality of frames in the video data.

12. The system of claim 1, wherein determining the complexity within the field of view of the image capture device includes determining a peak signal-to-noise ratio between a first frame in the video data and a second frame in the video data.

13. The system of claim 1, wherein the bitrate applied to the transcoded video is one of: a fixed bitrate, or a variable bitrate.

14. The system of claim 1, wherein generating the transcoded video includes transcoding the video according to a predetermined transcoding profile to generate the transcoded video at a predetermined bitrate.

15. The system of claim 1, wherein the operations further comprise encoding the captured video data to generate encoded video data, wherein the complexity is determined based on the encoded video data.

16. The system of claim 15, wherein the complexity is determined based on a comparison between at least a portion of the captured video data and at least a portion of the encoded video data.

17. The system of claim 15, wherein encoding the captured video data is performed using one or more of: a frame by frame encoding, and an encoding of a collection of frames.

18. The system of claim 15, wherein the captured video data is compressed, wherein a difference between the captured video data and the encoded video data results in a larger difference for compression artifacts between frames than non-compression artifacts.

19. A computer-implemented method comprising:
determining a complexity between at least two frames of captured video data, the captured video data including a field of view;
determining a particular bitrate that corresponds to a video quality metric for the complexity determined between the at least two frames; and
selecting a transcoding configuration that applies the particular bitrate among a plurality of bitrates to the video data causing generation of transcoded video data using the particular bitrate.

20. A non-transitory computer-readable medium storing instructions that, when executed by a computer system, cause the computer system to perform operations comprising:
determining a complexity between at least two frames of captured video data, the captured video data including a field of view;
determining a particular bitrate that corresponds to a video quality metric for the complexity determined between the at least two frames; and
selecting a transcoding configuration that applies the particular bitrate among a plurality of bitrates to the video data causing generation of transcoded video data using the particular bitrate.

* * * * *